(12) United States Patent
Chambers et al.

(10) Patent No.: US 6,230,216 B1
(45) Date of Patent: May 8, 2001

(54) METHOD FOR ELIMINATING DUAL ADDRESS CYCLES IN A PERIPHERAL COMPONENT INTERCONNECT ENVIRONMENT

(75) Inventors: Peter Chambers, Phoenix; Subramanian S. Meiyappan; Swaroop Adusumilli, both of Tempe, all of AZ (US)

(73) Assignee: VLSI Technology, Inc., San Jose, CA (US)

( * ) Notice: Subject to any disclaimer, the term of this patent is extended or adjusted under 35 U.S.C. 154(b) by 0 days.

(21) Appl. No.: 09/239,461

(22) Filed: Jan. 28, 1999

(51) Int. Cl.[7] .............................. G06F 3/00; G06F 13/14; G06F 9/00
(52) U.S. Cl. .................................. 710/4; 710/10; 710/66; 710/127; 713/1
(58) Field of Search .................................. 710/3–4, 8–19, 710/62–66, 126–132; 713/1, 2, 100

(56) References Cited

U.S. PATENT DOCUMENTS

| | | | |
|---|---|---|---|
| 4,025,906 | * | 5/1977 | Riikonen ............................ 710/16 |
| 4,234,934 | * | 11/1980 | Thorsrud ............................ 711/212 |
| 4,775,931 | * | 10/1988 | Dickie et al. ........................ 710/9 |
| 5,168,562 | * | 12/1992 | Estepp et al. .................... 364/232.8 |
| 5,220,651 | * | 6/1993 | Larson ................................ 710/8 |
| 5,237,672 | * | 8/1993 | Ing-Simmons et al. ............ 711/211 |
| 5,404,474 | * | 4/1995 | Crook et al. ...................... 711/212 |
| 5,446,845 | * | 8/1995 | Arroyo et al. .................... 710/127 |
| 5,530,837 | * | 6/1996 | Williams et al. .................. 711/157 |
| 5,535,349 | * | 7/1996 | Boaz et al. ........................ 711/1 |
| 5,590,287 | * | 12/1996 | Zeller et al. ...................... 710/127 |
| 5,600,814 | * | 2/1997 | Gahan et al. ...................... 711/100 |
| 5,787,246 | * | 7/1998 | Lichtman et al. .................. 709/220 |
| 5,802,392 | * | 9/1998 | Epstein et al. ...................... 710/4 |
| 5,828,865 | * | 10/1998 | Bell .............................. 395/500.48 |
| 5,835,931 | * | 11/1998 | Brandt et al. ...................... 711/5 |
| 5,845,153 | * | 12/1998 | Sun et al. .......................... 710/56 |
| 5,875,349 | * | 2/1999 | Cornaby et al. .................... 710/5 |
| 5,878,270 | * | 3/1999 | Kobayashi ...................... 395/712 |
| 5,909,592 | * | 6/1999 | Shipman .......................... 711/4 |
| 5,938,776 | * | 8/1999 | Sicola et al. ...................... 714/25 |

FOREIGN PATENT DOCUMENTS

98/09221 * 3/1998 (WO) ............................ G06F/12/02

* cited by examiner

*Primary Examiner*—Sumati Lefkowitz
(74) *Attorney, Agent, or Firm*—Wagner, Murabito & Hao LLP

(57) ABSTRACT

A system and method for using single address cycles and eliminating dual address cycles to transmit a target address in a computer system. The computer system comprises a bus, a central processing unit coupled to the bus, an initiator device coupled to the bus, and a target device coupled to the bus. The target device comprises a first configuration register which is adapted to use a configuration bit to indicate an address range of the target device. The central processing unit interrogates the first configuration register and communicates the address range indicated by the configuration bit to the initiator device. The initiator device comprises a second configuration register which is adapted to use a configuration bit to register the address range of the target device. The initiator device is adapted to disable its dual address cycle capability and transmit to the target device the target address in a single address cycle provided that the address range of the target device as indicated by the respective configuration bits in the first and second configuration registers is not less than a size of the target address.

20 Claims, 6 Drawing Sheets

METHOD FOR ELIMINATING DUAL ADDRESS CYCLES IN A PERIPHERAL COMPONENT INTERCONNECT ENVIRONMENT

TECHNICAL FIELD

The present invention pertains to the field of computer system bus architectures. More specifically, the present invention pertains to a method for optimizing address cycles in peripheral component interconnect bus systems.

BACKGROUND ART

A bus architecture of a computer system conveys much of the information and signals involved in the computer system's operation. In a typical computer system, one or more buses are used to connect a central processing unit (CPU) to a memory and to input/output devices so that data and control signals can be readily transmitted between these different components. When the computer system executes its programming, it is imperative that data and information flow as fast as possible in order to make the computer system as responsive as possible to the user. With many peripheral devices and subsystems, such as graphics adapters, full motion video adapters, small computer systems interface (SCSI) host bus adapters, and the like, it is imperative that large block data transfers be accomplished expeditiously. These applications are just some examples of peripheral devices and subsystems which benefit substantially from a very fast bus transfer rate.

Much of the computer system's functionality and usefulness to a user is derived from the functionality of the peripheral devices. For example, the speed and responsiveness of the graphics adapter is a major factor in a computer system's usefulness as an entertainment device. Or, for example, the speed with which video files can be retrieved from a hard drive and played by the graphics adapter determines the computer system's usefulness as a training aid. Hence, the rate at which data can be transferred among the various peripheral devices often determines whether the computer system is suited for a particular purpose.

The electronics industry has, over time, developed several types of bus architectures. The PCI (peripheral component interconnect) bus architecture has become one of the most widely used and widely supported bus architectures in the industry. The PCI bus was developed to provide a high speed, low latency bus architecture from which a large variety of systems could be developed.

A PCI specification is used to establish standards to facilitate uniformity and compatibility of PCI devices operating in a PCI bus architecture. Initially, the PCI specification addressed only the use of 32-bit devices and 32-bit transactions, but the specification has since been extended to 64-bit devices and transactions.

Prior Art FIG. 1 shows a simplified exemplary PCI bus architecture 100 implemented, for example, in a computer system. PCI bus 120 is coupled to PCI initiator 110. PCI bus 120 is also coupled to each of PCI target devices A 112, B 114, C 116 and D 118. PCI targets A 112, B 114, C 116 and D 118 are 64-bit target devices, having addresses encompassing up to 64 bits, which allow an address range of up to 16 exabytes in a 64-bit memory space. In addition, PCI bus 120 is a 64-bit bus and PCI initiator 110 is a 64-bit device.

PCI initiator 110 can be integrated into bus bridge 130, as shown, and bus bridge 130 in turn is used to couple PCI bus 120 to a host bus (not shown). Bus bridge 130 is typically a bi-directional bridge and is made up of numerous components; for simplicity, bus bridge 130 is shown as comprising only PCI initiator 110.

PCI bus 120 is comprised of functional signal lines, for example, interface control lines, address/data lines, error signal lines, and the like. Each of PCI target devices 112–118 are coupled to the functional signal lines comprising PCI bus 120.

At the time when a 64-bit initiator generates a transaction, it is not aware of the attributes of the target device; that is, it does not know whether the target is a 32-bit device or a 64-bit device. Hence, to ensure compatibility regardless of the respective ranges of the initiator and target devices, in the prior art an assumption is made that the target device is only capable of handling a 32-bit operand. Thus, the prior art technique for transmitting a 64-bit address is to represent the 64-bit address as two 32-bit operands and drive the address over the bus using dual address cycles (also known as dual address commands, DACs), one cycle to transmit each of the 32-bit operands. Because two operands are passed across the PCI bus, two PCI clock cycles are needed to complete a DAC.

With reference now to Prior Art FIG. 2, timing diagram 200 is provided exemplifying a simplified transaction using DACs according to the prior art. For simplicity, Prior Art FIG. 2 does not illustrate all of the signals associated with a transaction, but only shows those signals pertaining to the discussion herein. Timing diagram 200 illustrates a transaction initiated by a 64-bit initiator device over a PCI bus capable of supporting 64-bit transactions (e.g., PCI initiator 110 and PCI bus 120 of Prior Art FIG. 1).

Continuing with reference to Prior Art FIG. 2, PCI initiator 110 starts the transaction on the rising edge of PCI clock cycle 1 by asserting the FRAME# and REQ64# signals (at points 245 and 250, respectively). Generally, FRAME# is used to indicate the start of a transaction, and REQ64# to indicate that the transaction includes a 64-bit data transfer. These signals are known in the art and are as defined in the PCI specification.

In clock cycle 1, PCI initiator 110 also drives the lower portion of the address (e.g., low address 210) onto AD[31:0] and the upper portion of the address (e.g., high address 220) onto AD[63:32], and it continues to drive high address 220 onto AD[63:32] for the duration of both address phases of the DAC. During clock cycle 2, PCI initiator 110 starts the second address phase of the DAC by driving high address 215 onto AD[31:0]. All devices on the PCI bus latch onto these addresses, and during clock cycle 3 they decode the address. The target named by the address claims the transaction in clock cycle 3 by asserting the DEVSEL# signal (at point 240). On the rising edge of clock cycle 4, turn-around cycles 225 are inserted in AD[31:0] and AD[63:32]. Data A 230 and data B 232 are then driven onto the bus by the target device or by the initiator device depending on the type of transaction. Thus, in the prior art a 64-bit address is divided into 32-bit operands and transmitted via a DAC, even if the target device is a 64-bit device and therefore capable of reading a 64-bit address.

If a 64-bit address is transmitted over the PCI bus in a single address cycle, the 32-bit target devices on the bus, as well as the 64-bit target devices, latch onto the address. However, the 32-bit targets will only be capable of reading a portion of the address (namely, the lower half of the address), because these devices do not have access to the upper 32 bits of the address. In the likely case in which the lower half of a 64-bit address matches the 32-bit address of a 32-bit device, that 32-bit device will erroneously assert a claim to the transaction. In the meantime, the 64-bit device that is the intended recipient of the address will also assert a claim to the transaction after it decodes and recognizes its address, so that two devices will have asserted a claim to the same transaction. This type of error is known as address aliasing. Address aliasing causes other types of errors to occur, such as incorrect data being sent, bus contention due to multiple and simultaneous drivers, and the like.

Consider as an example a 32-bit target that is mapped into address 0000 0000h to 0000 FFFFh in a 32-bit memory space. A 64-bit initiator then specifies an address of 0000 0001 0000 1000h for a 64-bit target mapped into a 64-bit memory space. The 32-bit target latches onto the address but is only capable of reading the latter portion of the address, specifically the portion 0000 1000h, which, from the perspective of the 32-bit target, appears to fall within the range of addresses into which the 32-bit target device is mapped. Hence, the 32-bit target responds, as does the 64-bit target.

To avoid the potential for address aliasing, in the prior art 64-bit addresses are sent via DACs. Therefore, the prior art is problematic because a single address cycle (or single address command, SAC) cannot be used to transmit a 64-bit address as a single 64-bit operand to a 64-bit target device, even if the 64-bit initiator knows that the target device is a 64-bit device.

As can be seen from Prior Art FIG. 2, two clock cycles are needed to transmit a DAC. Thus, another disadvantage to the prior art is that two clock cycles are used to transmit a 64-bit address from a 64-bit initiator to a 64-bit target when one clock cycle would be satisfactory. Consequently, in the prior art, data transfer subsequent to the address phase is delayed by one clock cycle. In addition, during the transaction, the PCI initiator requires ownership of the PCI bus, and thus the PCI bus is not available for other transactions. Thus, in the prior art, other transactions are also delayed because a portion of the computer system's data transfer bandwidth is consumed by the unnecessary clock cycle. This disadvantage is especially significant when multiplied by the number of transactions that occur on the PCI bus.

Accordingly, what is needed is a method and/or system that reduces or eliminates the use of DACs to transmit 64-bit addresses. What is also needed is a method and/or system that addresses the above need and does not cause address aliasing and errors associated with address aliasing when a SAC is used. The present invention provides a novel solution to the above needs.

These and other objects and advantages of the present invention will become obvious to those of ordinary skill in the art after having read the following detailed description of the preferred embodiments which are illustrated in the various drawing figures.

DISCLOSURE OF THE INVENTION

The present invention provides a system and method which reduce or eliminate the use of DACs to transmit 64-bit addresses. The present invention also provides a system and method that address the above need and do not cause address aliasing and other errors associated with address aliasing when a SAC is used.

The present invention is a system and method for using SACs instead of DACs to transmit 64-bit target addresses in a computer system that includes 64-bit initiator devices and 64-bit target devices. The computer system includes a bus, a central processing unit coupled to the bus, an initiator device coupled to the bus, and a target device coupled to the bus. The target device comprises a first configuration register which is adapted to use a configuration bit to indicate an address range of the target device. The central processing unit interrogates the first configuration register and communicates the address range indicated by the configuration bit to the initiator device. The initiator device comprises a second configuration register which is adapted to use a configuration bit to register the address range of the target device. The initiator device is adapted to disable its dual address cycle capability and transmit to the target device the target address in a single address cycle provided that the address range of the target device as indicated by the respective configuration bits in the first and second configuration registers is not less than a size of the target address.

In one peripheral component interconnect (PCI) embodiment, the bus, the initiator device, and the target device are PCI devices. The target device is a 64-bit device, the address range of the target device is 64 bits, the initiator device is a 64-bit device, and the size of the target address is 64 bits.

BRIEF DESCRIPTION THE DRAWINGS

The accompanying drawings, which are incorporated in and form a part of this specification, illustrate embodiments of the invention and, together with the description, serve to explain the principles of the invention:

BEST MODE FOR CARRYING OUT THE INVENTION

Figure 1:
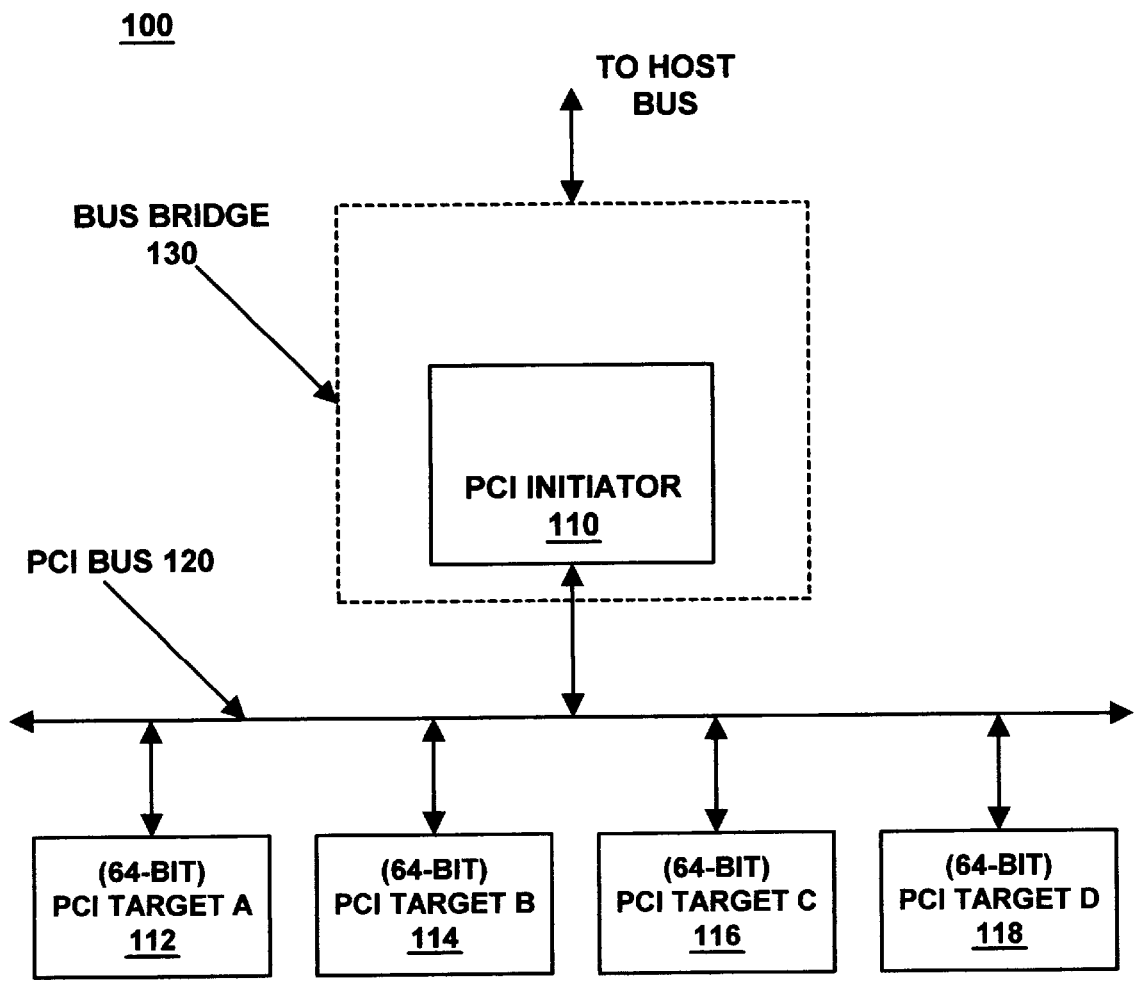
FIG. 1 is a block diagram of a simplified exemplary peripheral component interconnect (PCI) bus architecture of the prior art.
Figure 2:
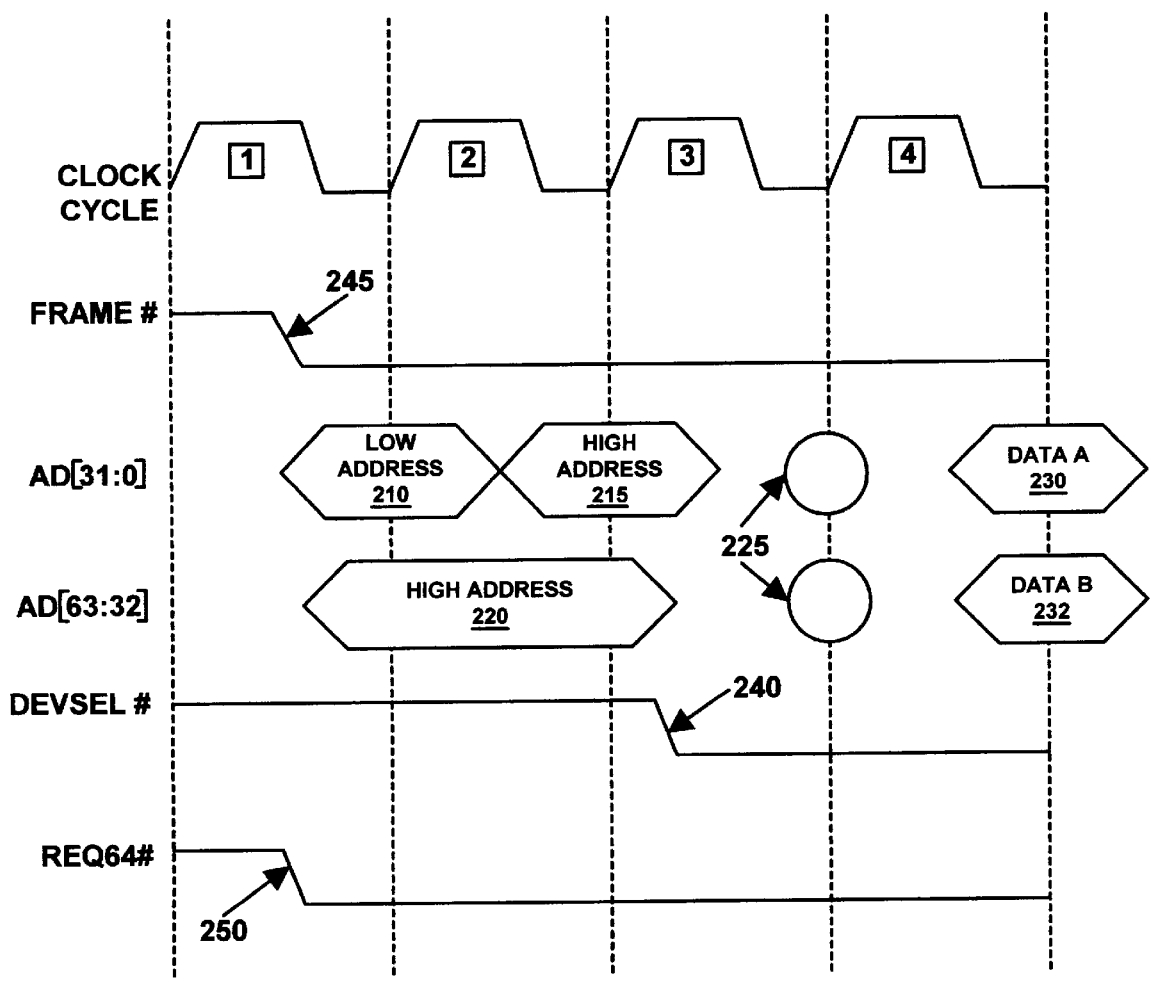
FIG. 2 illustrates a timing cycle showing the address phases of a 64-bit transaction in accordance with the prior art.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

As used herein, a transaction refers to the transmission or receipt of data or other such message information. The transaction may consist of all data associated with a particular computer system operation (e.g., a request or command). A transaction may also consist of a block of data associated with a particular operation; for example, a transfer of data may be broken down into several blocks of data, each block transferred prior to the transfer of a subsequent block, and each block making up a transaction.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "operating," "calculating," "determining," "displaying," or the like, refer to actions and processes of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

The present invention is a system and method for using SACs instead of DACs to transmit 64-bit target addresses between 64-bit initiator devices and 64-bit target devices. The present invention does not cause address aliasing and other errors associated with address aliasing when a SAC is used. The present invention system and method are used to determine whether there are 32-bit target devices in a computer system. If there are only 64-bit target devices, the capability for the initiator devices to use DACs is disabled and SACs are used to transmit 64-bit target addresses.

In the discussion of the embodiments which follow, the initiator device, target devices and bus are peripheral component interconnect (PCI) compliant devices. As such, the following discussions are provided in the context of a PCI-compliant bus system. However, it is understood that other configurations of a bus system may be used in accordance with the present invention, such as, for example, Micro Channel, EISA (Extended Industry Standard Architecture), and the like.

Figure 3:
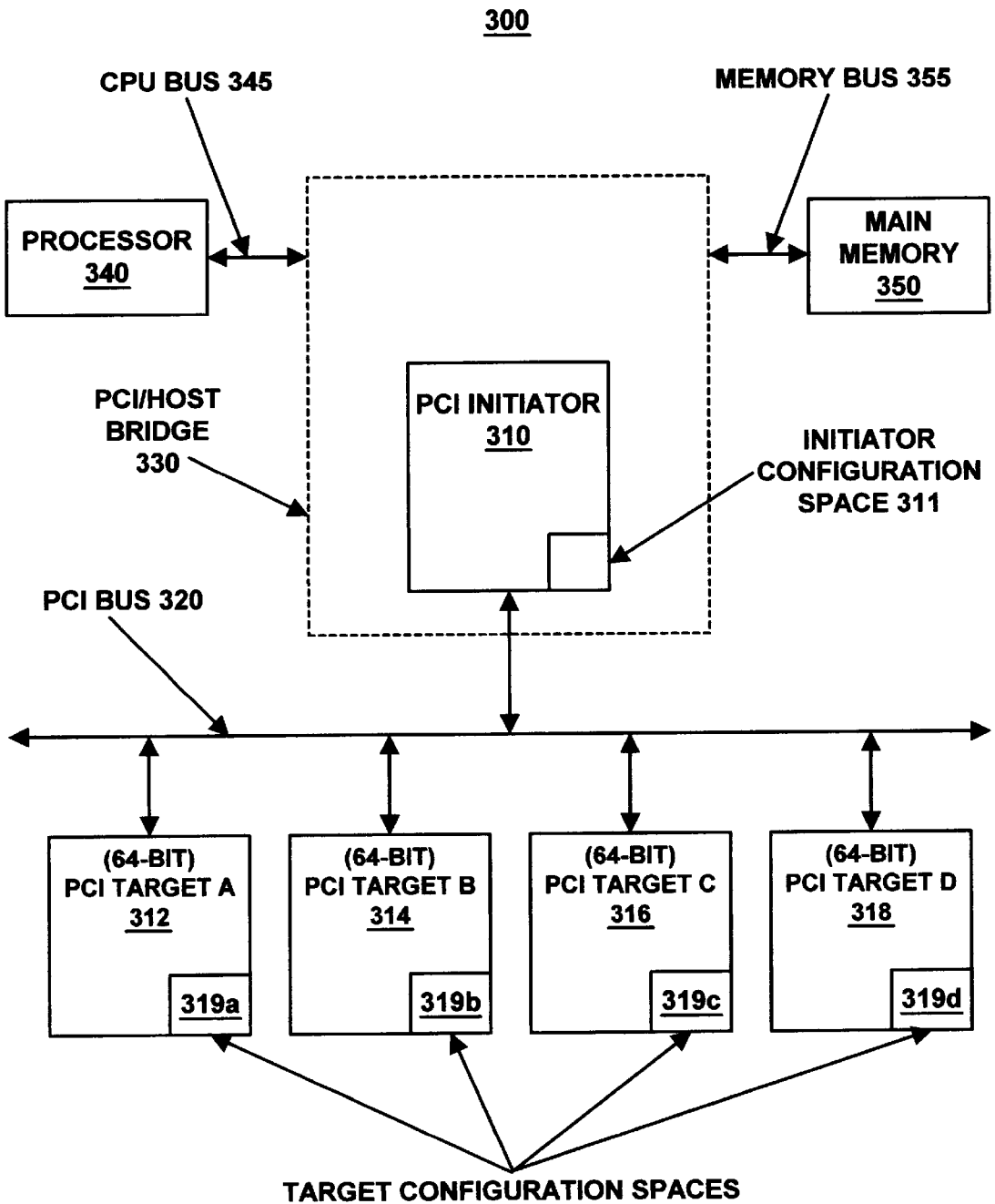
FIG. 3 is a block diagram of an exemplary PCI bus architecture implemented in a computer system in accordance with one embodiment of the present invention.

Refer now to FIG. 3, which shows an exemplary PCI bus system implemented in computer system 300 in accordance with a PCI-compliant embodiment of the present invention. The PCI bus system of computer system 300 includes PCI bus 320 coupled to PCI initiator 310. In the present embodiment, PCI initiator 310 is integrated into PCI/host bridge 330. PCI/host bridge 330 is a bi-directional PCI bridge (for simplicity, the elements of a bi-directional bridge other than PCI initiator 310 are not shown). PCI/host bridge 330 is used to couple PCI bus 320 to processor 340 via central processing unit (CPU) bus 345 and to main memory 350 via memory bus 355.

PCI bus 320 is also coupled to 64-bit PCI target A 312, B 314, C 316 and D 318. PCI target A 312, B 314, C 316 and D 318 have addresses that encompass up to 64 bits; that is, a 64-bit address refers to an address up to 64 bits in size. Commonly, 64-bit addresses include addresses less than 64 bits in size.

Per the PCI specification, all PCI devices include configuration spaces that provide information regarding the devices' configuration requirements. Accordingly, PCI target A 312, B 314, C 316 and D 318 include target configuration space 319a, 319b, 319c and 319d, respectively. Similarly, PCI initiator 310 includes initiator configuration space 311. It is understood that a configuration space may comprise more than one configuration register, and thus initiator configure space 311 and target configuration spaces 319a–d each represent a plurality of configuration registers.

Continuing with reference to FIG. 3, in accordance with the PCI specification, when a computer system (e.g., computer system 300) is first powered on, configuration software stored in main memory (e.g., main memory 350) or in another memory location (not shown) is executed by the CPU (e.g., processor 340). The configuration software, generally referred to as the PCI bus enumerator, scans the PCI bus (e.g., PCI bus 320) to determine what PCI devices exist on the bus and what configuration requirements those devices have. The configuration spaces (e.g., target configuration spaces 319a–d and initiator configuration space 311) and the configuration registers contained therein are thereby interrogated by processor 340. Processor 340 uses the information from the configuration registers to configure the PCI bus system. Processor 340 communicates this information to PCI/host bridge 330 in order to instruct the bridge to perform configuration read and write transactions.

Figure 4:
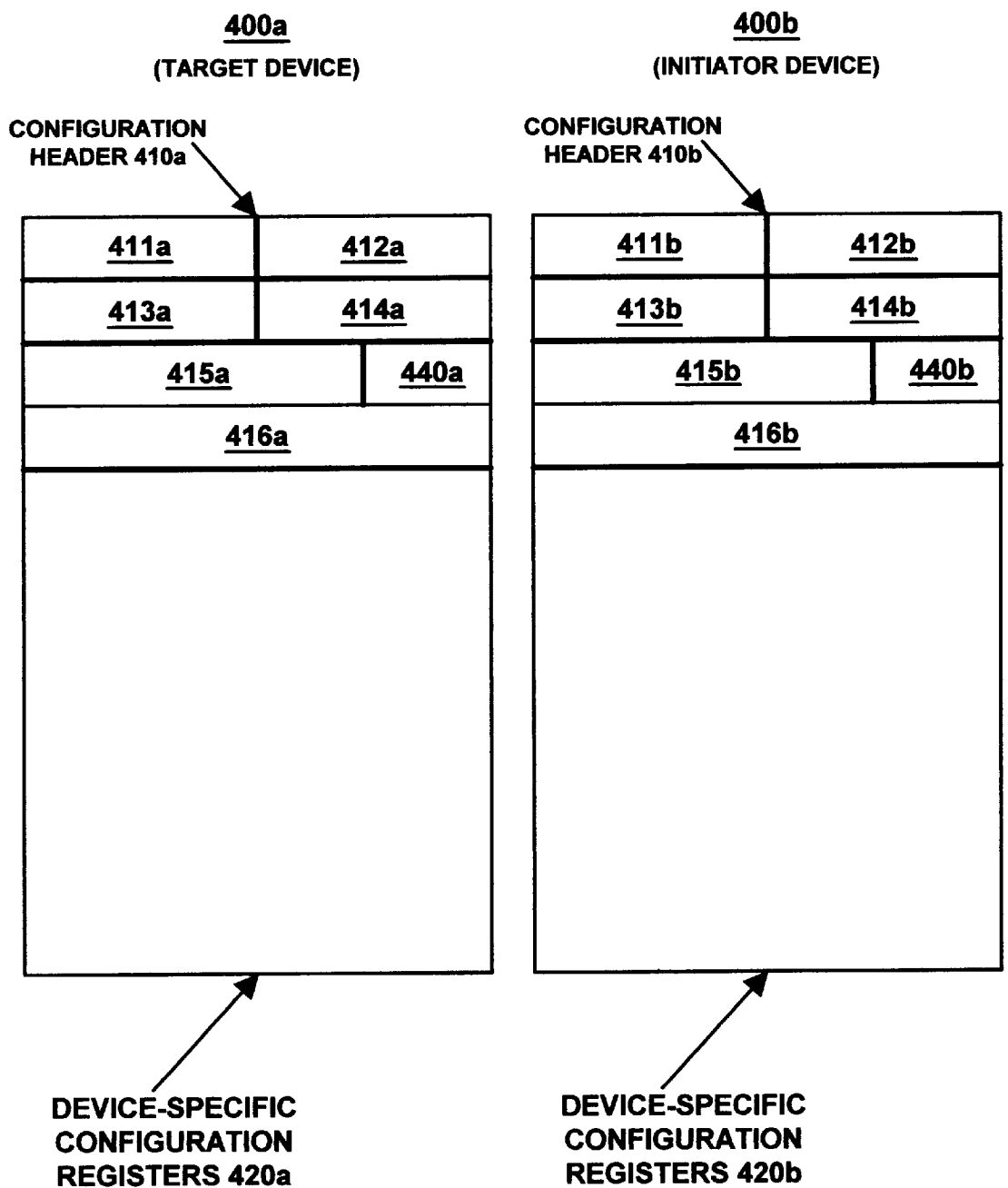
FIG. 4 is an illustration of a configuration register in accordance with one embodiment of the present invention.

FIG. 4 provides an illustration of configuration spaces 319a and 311 in accordance with the present embodiment of the present invention. Per the PCI specification, each PCI device possesses a block of configuration addresses reserved for implementation of its device-specific configuration register(s). The format (or usage) of a subset of those configuration addresses are predefined by the PCI specification; this subset is referred to as the configuration header. Hence, configuration space 319a includes configuration header 410a and device-specific configuration registers 420a in accordance with the PCI specification, and similarly configuration space 311 includes configuration header 410b and device-specific configuration registers 420b.

Continuing with reference to FIG. 4, configuration header 410a includes a plurality of configuration registers 411a, 412a, 413a, 414a, 415a and 416a, and similarly configuration header 410b includes a plurality of configuration registers 411b, 412b, 413b, 414b, 415b and 416b. It is understood that FIG. 4 is only representative of PCI configuration spaces, and that a configuration space may contain more configuration registers in different arrangements than shown in FIG. 4. The configuration registers in configuration headers 410a and 410b are used to identify, respectively, the target device and the initiator device, control their PCI functions, sense their status, and the like.

With reference to FIGS. 3 and 4, in accordance with the present embodiment of the present invention, a configuration register (e.g., configuration register 440a) is specified in configuration space 319a to indicate the size (range) of the target device. Specifically, configuration register 440a is included in configuration header 410a of a PCI target (e.g., PCI target A 312). In the present embodiment, configuration register 440a is equivalent to a bit, although it is understood that different sizes of registers can be used in accordance with the present invention. In configuration space 319a of PCI target A 312, configuration register 440a is used to indicate that PCI target A 312 is a 64-bit target with the capability to receive and decode 64-bit target addresses via a single address cycle.

In a similar manner, a configuration register (e.g., configuration register 440b) is also specified in configuration space 311. Specifically, configuration register 440b is included in configuration header 410b of a PCI initiator (e.g., PCI initiator 310). In the present embodiment, configuration register 440b is equivalent to a bit, although it is understood that different sizes of registers can be used in accordance with the present invention. For example, when there are multiple PCI target devices on PCI bus 320 of FIG. 3, if all target devices are 64-bit targets, this fact is registered in configuration register 440b. Alternatively, the range of each target device is separately registered in configuration register 440b. Additional information is provided below in conjunction with FIG. 5.

Thus, continuing with reference to FIGS. 3 and 4, in accordance with the present embodiment of the present invention, processor 340 executes the configuration software (e.g., the PCI bus enumerator) to scan the PCI bus and access PCI target A 312. The configuration software interrogates configuration register 440a of PC I target A 312 and reads that the device is a 64-bit target. The configuration software also interrogates other PCI targets on PCI bus 320 and determines their respective ranges. The configuration software provides this information to PCI/host bridge 330, which in the present embodiment registers this information in configuration register 440b of PCI initiator 310 as explained above.

From the interrogation, PCI initiator 310 is able to determine whether all of the target devices on PCI bus 320 are 64-bit devices. In accordance with the present invention, when there are no 32-bit targets on PCI bus 320, it is not necessary to transmit a target address via a dual address cycle. Therefore, in accordance with the present invention, PCI initiator 310 disables its dual address cycle capability. In this manner, the present invention eliminates DACs and uses SACs for transmitting 64-bit target addresses from 64-bit PCI initiators to 64-bit PCI targets. The present invention first establishes that there are no 32-bit targets on the PCI bus before SACs are used for 64-bit target addresses, and so the present invention prevents address aliasing from occurring.

Figure 5:
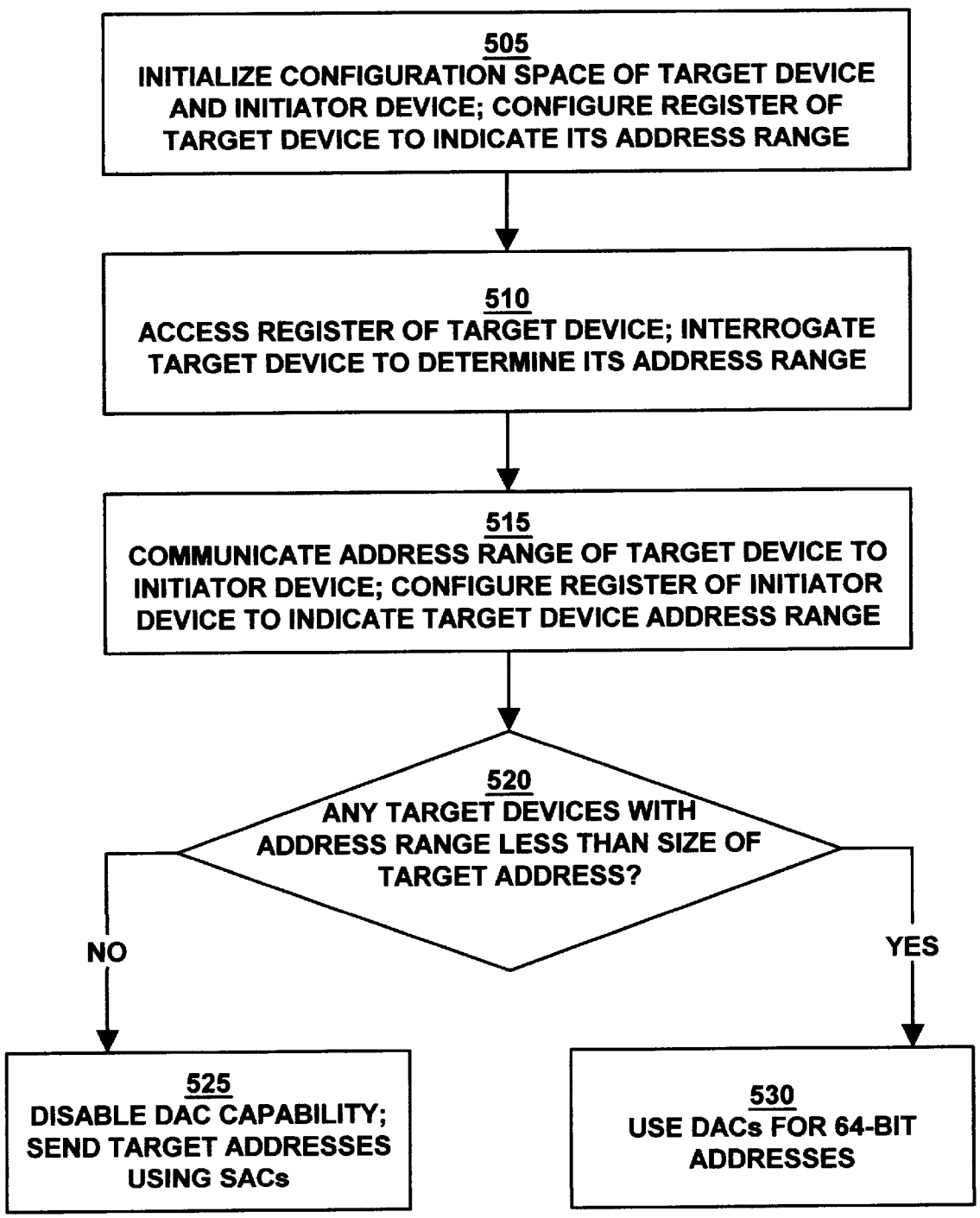
FIG. 5 is a flowchart of the process used for transmitting a 64-bit target address in accordance with one embodiment of the present invention.

FIG. 5 provides a flowchart of process 500 used for transmitting a 64-bit target address in accordance with the present embodiment of the present invention. Process 500 is implemented as program instructions executed by a central processing unit of a computer system (e.g., processor 340 of computer system 300 in FIG. 3). Other methods may be used to implement process 500 in accordance with the present invention.

In step 505, immediately after the computer system is powered on, the configuration spaces in the target devices and initiator devices on the PCI bus (e.g., configuration space 319a and configuration space 311 of PCI target A 312 and PCI initiator 310, respectively, on PCI bus 320 of FIG. 3) are initialized to indicate, for example, the addresses assigned to each device. Also at this time, in accordance with the present invention, configuration register 440a in PCI target A 312 is configured accordingly to indicate that this device is a 64-bit target. For example, a bit representing configuration register 440a is assigned a specific value (e.g., zero or one) to indicate that PCI target A 312 is a 64-bit target. In the same manner, the configuration registers for the other PCI targets on PCI bus 320 are each configured to indicate their respective address range.

In step 510, the computer system's configuration software (e.g., the PCI bus enumerator) scans PCI bus 320 to determine which devices are present on the bus and what configuration requirements they have. The configuration software is typically executed by the computer system's central processing unit (e.g., processor 340 of FIG. 3). The configuration software accesses configuration space 319a of PCI target A 312, including configuration register 440a. The configuration software interrogates configuration register 440a and determines that PCI target A 312 is a 64-bit target device. In the same manner, the configuration software determines the respective address range for each PCI target on PCI bus 320.

In step 515, the configuration software communicates with PCI initiator 310, and configuration register 440b is appropriately configured to properly reflect the information obtained in step 510. For example, a specified value (e.g., zero or one) is assigned to a single configuration bit in configuration register 440b to indicate that all target devices on PCI bus 320 are 64-bit targets; a value other than the specified value would indicate that a 32-bit target is present on PCI bus 320. Alternatively, the configuration software separately registers the range of each target device using multiple bits in configuration register 440b. For example, a specified value (e.g., zero or one) is used to indicate a 64-bit target, and if all bits in configuration register 440b are equal to the specified value then all target devices are 64-bit targets; a value in configuration register 440b other than the specified value would indicate that a 32-bit target is present on PCI bus 320.

In step 520, PCI initiator 310 makes a determination regarding whether there are target devices on PCI bus 320 that are 32-bit targets. For example, in the case in which PCI initiator 310 is going to transmit a 64-bit target address, PCI initiator 310 uses the information from step 515 to determine whether there is a target device on PCI bus 320 with an address range of less than 64 bits (that is, PCI initiator 310 makes a determination whether a 32-bit target is present on PCI bus 320).

In step 525, if there are no target devices on PCI bus 320 with an address range less than the size of the target address, PCI initiator 310 disables its DAC capability. Consequently, PCI initiator 310 will transmit 64-bit target addresses via SACs. Because, in accordance with the present invention, PCI initiator 310 first determines that there are no 32-bit targets on PCI bus 320, when a 64-bit target address is transmitted via a SAC, address aliasing will not occur.

In step 530, if there are target devices on PCI bus 320 with an address range less than the size of the target address, PCI initiator 310 does not disable its DAC capability. In this case, 64-bit target addresses are sent via DACs and thus address aliasing will not occur.

The present invention thus provides a method for transmitting 64-bit target addresses via a SAC without causing address aliasing or other problems associated with address aliasing.

Figure 6:
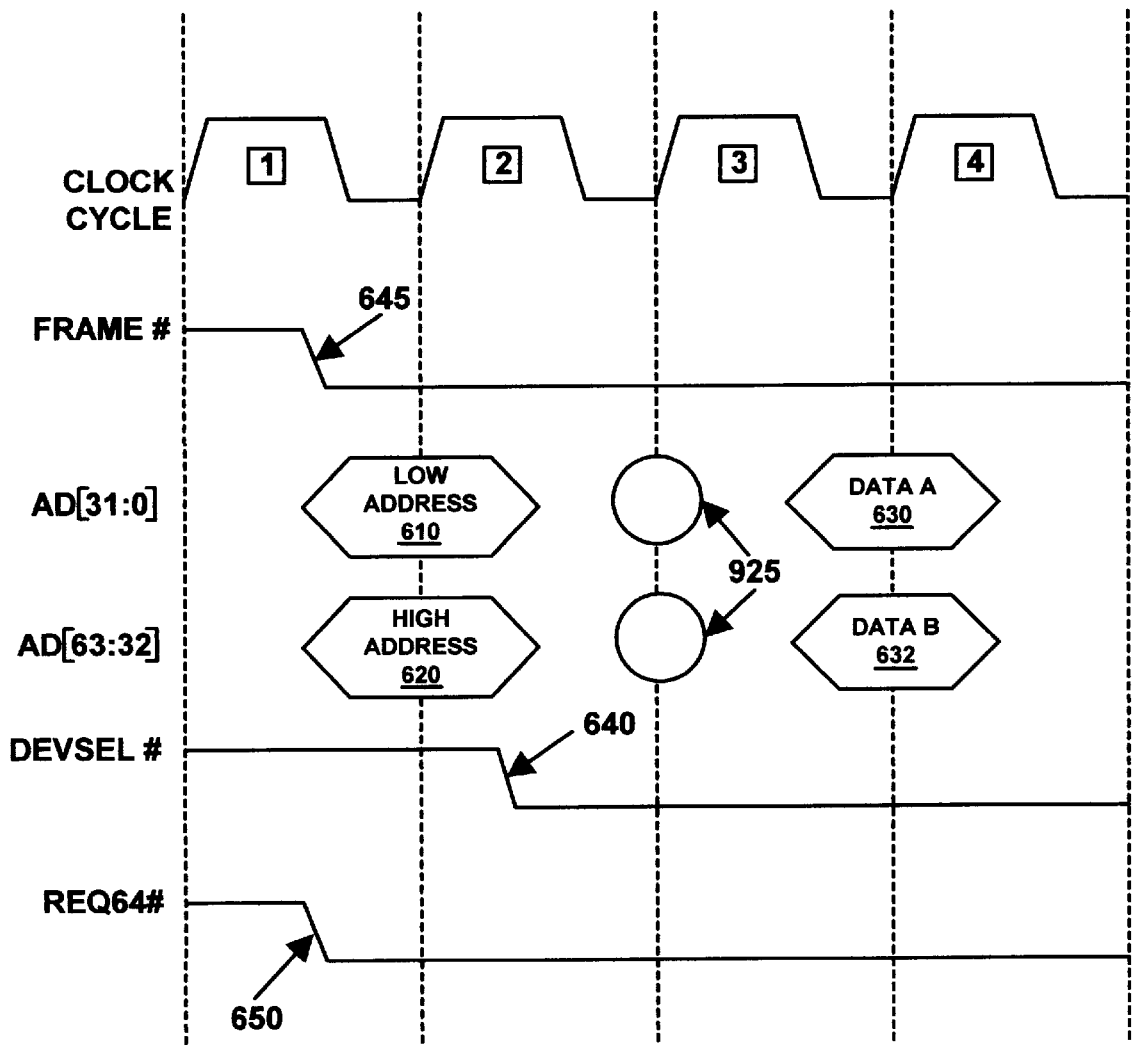
FIG. 6 illustrates a timing cycle for a 64-bit target and a 64-bit target address in accordance with one embodiment of the present invention.

FIG. 6 is an illustration of timing cycle 600 exemplifying a 64-bit transaction between a 64-bit initiator device (e.g., PCI initiator 310 of FIG. 3) and a 64-bit target (e.g., PCI target A 312 of FIG. 3) in accordance with the present invention. For simplicity, FIG. 6 does not include all of the signals associated with a transaction, but only shows those signals pertaining to the discussion herein. PCI initiator 310 starts the transaction on the rising edge of PCI clock cycle 1 by asserting the FRAME# and REQ64# signals at points 645 and 650, respectively. Also in clock cycle 1, in accordance with the present invention, using a SAC, PCI initiator 310 drives the lower portion of the target address (e.g., low address 610) and the upper portion of the target address (e.g., high address 620) onto PCI bus 320 (FIG. 3) over AD[31:0] and AD[63:32], respectively. PCI target A 312 receives both portions of the target address and decodes the target address in clock cycle 2. Recognizing the target address as its address, PCI target A 312 claims the transaction by asserting DEVSEL# in clock cycle 2 at point 640. Turn-around cycles 625 are inserted during clock cycle 3, and data A 630 and B 632 are then driven onto PCI bus 320 by either PCI initiator 310 or PCI target A 312, depending on the type of transaction (e.g., a read transaction or a write transaction). Thus, as shown by FIG. 6, the present invention allows the address cycle to be completed and the transfer of data to occur one clock cycle sooner than possible when DACs are used to transmit a 64-bit address.

The present invention thus provides a system and method that eliminate the use of DACs to transmit 64-bit target address from a 64-bit initiator to a 64-bit target. The present invention instead uses SACs, and accomplishes this while preventing address aliasing or other errors associated with address aliasing, such as bus contention. As such, the present invention optimizes the data transfer bandwidth of a computer system and eliminates the unnecessary expenditure of clock cycles caused when DACs are used for 64-bit transactions between 64-bit devices.

The preferred embodiment of the present invention, method for eliminating dual address cycles, is thus described. While the present invention has been described in particular embodiments, it should be appreciated that the present invention should not be construed as limited by such embodiments, but rather construed according to the following claims.

What is claimed is:

1. A computer system comprising:
   a bus;
   a central processing unit coupled to said bus;
   a plurality of target devices coupled to said bus, each of said plurality of target devices comprising a first configuration register, said first configuration register adapted to indicate an address range of its corresponding target device; and
   an initiator device coupled to said bus, said initiator device comprising a second configuration register, said second configuration register adapted to register said address range of each of said plurality of target devices;
   said initiator device adapted to transmit a target address to a target device in a single address cycle, if said second configuration register indicates that said address range of each of said plurality of target devices is not less than a size of said target address;
   said initiator device further adapted to transmit a target address to a target device in a dual address cycle, if said second configuration register indicates that said address range of an one of said plurality of target devices is less than all size.

2. The computer system of claim 1 wherein said bus, said initiator device, and said plurality of target devices are peripheral component interconnect (PCI) compliant devices.

3. The computer system of claim 1 wherein said target device receiving said target address in a single address cycle is a 64-bit device with a 64-bit address range, said initiator device is a 64-bit device, and said size of said target address is 64 bits.

4. The computer system of claim 1 wherein said first configuration register for each of said plurality of target devices comprises a configuration bit for indicating an address range of its corresponding target device.

5. The computer system of claim 1 wherein said second configuration register comprises a configuration bit, wherein said configuration bit has a first value indicating that said address range of each of said plurality of target devices is not less than a size of said target address, and wherein said configuration bit has a second value indicating that said address range of any one of said plurality of target devices is less than a size of said target address.

6. The computer system of claim 5 wherein said configuration bit of said second configuration rester is for indicating that a single address cycle is to be used to transmit a target address to a target device when said address range of each of said plurality of devices is not less than said size of said target address.

7. The computer system of claim 5 wherein said configuration bit of said second configuration register is for disabling a dual address cycle capability of said initiator device when said address range of each of said plurality of target devices is not less than said size of said target address.

8. The computer system of claim 1 wherein said central processing unit is adapted to interrogate said first configuration register of each of said plurality of target devices and to communicate said address range of each of said plurality of target devices to said initiator device.

9. A method for transmitting a target address from an initiator device to one of plurality of target devices in a computer system, said method comprising the steps of:
   a) accessing a configuration register of each of said plurality of target devices, said configuration register indicating an address range of its corresponding target device;
   b) communicating said address range of each of said plurality of target devices to said initiator device; and
   c) transmitting said target address to said on of said plurality of target devices in a single address cycle, if said configuration register of each of said plurality of target devices indicates that said address range of each of said plurality of target devices is not less than a size of said target address, and
   transmitting said target address to said one of said plurality of target devices in a dual address cycle, if said configuration register of each of said plurality of target devices indicates that said address range of any one of said plurality of target devices less than a size of said target address.

10. The method of claim 9 wherein said initiator device and said plurality of target devices are peripheral component interconnect (PCI) compliant devices.

11. The method of claim 9 wherein said target device receiving said target address in said single address cycle is a 64-bit device with a 64-bit address range, said initiator device is a 64-bit device, and said size of said target address is 64 bits.

12. The method of claim 9 wherein step a) further comprises configuring a bit in said configuration register of each of said plurality of target devices to indicate said address range of its corresponding target device.

13. The method of claim 9 wherein step b) comprises communicating said address range of each of said plurality of target devices to a configuration register of said initiator device.

14. The method of claim 9 wherein step b) further comprises configuring a bit of said configuration register of said initiator device, wherein said bit has a first value indicating that said address range of each of said plurality of target devices is not less than a size of said target address, and wherein said bit has a second value indicating that said address range of any one of said plurality of target devises is less than a size of said target address.

15. The method of claim 9 wherein step b) comprises a central processing unit of said computer system interrogating said configuration register of each of said plurality of target devices and communicating said address range of each of said plurality of target devices to said configuration register of said initiator device.

16. The method of claim 9 wherein step c) further comprises disabling a dual address cycle capability of said initiator device when said address range of each of said plurality of devices is not less than said size of said target address.

17. A method for transmitting a target address from an initiator device to one of a plurality target devices in a computer system using a single address cycle, said method comprising the steps of:

a) configuring a bit in a configuration register of each of said plurality of target devices to indicate an address range of said target device corresponding to said configuration register;

b) configuring a bit in a configuration register of said initiator device to register said address range of each of said plurality of target devices; and c) disabling a dual address cycle capability and enabling a single address cycle capability of said initiator device when said bit in said configuration register of said initiator device indicates said address range of each of said plurality of target device is not less than a size of said target address, and maintaining a dual address cycle capability of said initiator device when said bit in said configuration register of said initiator device indicates said address range of any one of said plurality of devices is less than a size of said target address.

18. The method of claim 17 wherein said initiator device and said plurality of target devices are peripheral component interconnect (PCI) compliant devices.

19. The method of claim 17 wherein said one of said plurality of target devices is a 64-bit device, said address range of said one of said plurality of target devices is 64 bits, said initiator device is a 64-bit device, and said size of said target address is 64 bits.

20. The method of claim 17 wherein a central processing unit is used to read said bit in said configuration register of each of said plurality of target devices and communicate a value of said bit to said initiator device.

* * * * *